United States Patent [19]
Salisbury

[11] 4,397,809
[45] Aug. 9, 1983

[54] CHARGED PARTICLE MACHINE

[75] Inventor: Winfield W. Salisbury, Scottsdale, Ariz.

[73] Assignee: Energy Profiles, Inc., Newtown Square, Pa.

[21] Appl. No.: 201,542

[22] Filed: Oct. 28, 1980

Related U.S. Application Data

[62] Division of Ser. No. 21,115, Mar. 16, 1979, abandoned.

[51] Int. Cl.$^3$ .................................................. G21B 1/00
[52] U.S. Cl. ........................................ 376/107; 376/127
[58] Field of Search .......................... 376/107, 127–129, 376/139, 144; 950/251, 423 R; 313/359.1, 362.1, 363.1; 315/111.41, 111.61

[56] References Cited

U.S. PATENT DOCUMENTS

| | | | |
|---|---|---|---|
| 3,005,767 | 10/1961 | Boyer et al. | 176/5 |
| 3,039,014 | 6/1962 | Chang | 176/4 |
| 3,096,269 | 7/1963 | Halbach et al. | 176/6 |
| 3,132,996 | 5/1964 | Baker et al. | 176/6 |
| 3,321,664 | 5/1967 | Phillips et al. | 176/3 |
| 3,418,206 | 12/1968 | Hall et al. | 176/2 |
| 3,445,333 | 5/1969 | Lecomte | 176/1 |
| 3,501,376 | 3/1970 | Dow et al. | 176/1 |
| 3,859,164 | 1/1975 | Nowek | 176/5 |
| 4,189,346 | 2/1980 | Jarnagin | 176/5 |

FOREIGN PATENT DOCUMENTS

| | | | |
|---|---|---|---|
| 2346819 | 3/1975 | Fed. Rep. of Germany | 176/2 |
| 1012751 | 12/1965 | United Kingdom | 176/2 |

*Primary Examiner*—Harvey E. Behrend
*Attorney, Agent, or Firm*—Richards, Harris & Medlock

[57] ABSTRACT

Atomic nuclei undergo fusion reactions by forming two beams of fusible ions traveling at fusion producing velocities opposed in rotation along spiral paths having common axes (35a), common radii and occupy common space in a reaction zone (22) for fusion producing collisions of ions in one beam with ions in the other beam.

Means including sources (16 and 17) produce the oppositely traveling circumferential beams.

Radially directed electric fields are applied to the beams of strength increasing with increasing distance from sources (16 and 17) for beam compression into spiral paths of a common reduced diameter passing through common space in zone (22) to promote collisions between ions in the oppositely traveling beams as they travel in the common space.

2 Claims, 11 Drawing Figures

CHARGED PARTICLE MACHINE

This is a division of application Ser. No. 21,115, filed Mar. 16, 1979, abandoned.

TECHNICAL FIELD

This invention relates to the generation of energy from the fusion of atomic nuclei which are caused to travel towards each other along collision courses, orbiting in common paths having common axes and equal radii.

BACKGROUND ART

It is known that individual nuclear particles are so constituted as to permit fusing of the lighter nuclei. Fusion of lighter nuclei is accompanied by release of energy. Of particular interest is any fusion reaction in which power can be produced in quantities greater than the power consumed in establishing and maintaining the reaction. There are over 30 reactions now known to be possible. The most appealing reactions are those which involve the heavy hydrogen isotopes, deuterium and tritium, because they tend to have the largest fusion reaction cross section at the lowest energies. Many possible reactions are well known. For example, *Van Norstrand's Scientific Encyclopedia*. Fifth Edition, Reinhold Company, New York, N.Y., 1976, at page 1656, et seq., discusses various aspects of the possibilities for producing a net gain in power from fusion reactions and briefly describes some of the attempts to perform such reactions with a net power gain.

Plasma research has received concentrated attention in many quarters, but the formidable task of plasma containment has yet to be solved. In avoidance of the problems of containment, a more recent approach involves laster-induced fusion. In its simplest form a focused energetic laser beam is brought to bear on a small deuterium-tritium pellet for heating to fusion temperatures. Efforts on this and on other fronts such as those involving containment has been steady in response to high incentives.

Thus, while many of the possibilities have long been known and have been widely attacked through various approaches towards achieving net power gain from fusion, the challenge remains unsatisfied.

The obvious advantage of fusion power is that it offers the promise of being able to utilize an essentially inexhaustible low cost fuel supply. This prospect is a growing challenge as world demands for energy continue to increase. A further significant advantage is that optimum fuels may be chosen to produce reaction products which are completely non-toxic and thus permit energy producing operations compatible with the most demanding environmental requirements.

The most desirable reactions, the ones free of neutron generation, produce energy in the way that is shieldable for personnel protection simply by the presence of structures necessary for carrying out the fusion reaction.

In application of this invention, the individual reactants are combined in such a way that they are not individually self-reactant. This permits definitive choice and execution of neutronless fusion.

DISCLOSURE OF THE INVENTION

The present invention proceeds along a new front in the field of atomic fusion for applications which include power generation and is based upon controlling the direction of travel of atomic particles so as to assure fusion promoting collisions.

Appropriately high velocity fusible ion beams are directed along head-on circumferential collision paths in an annular zone wherein beam compression by electrostatic focusing greatly enhances head-on fusion producing collisions. Energy released upon fusion can then be utilized.

The invention involves generating two beams of fusible ions which are forced to travel towards each other along spiral paths. In one embodiment, a steady radial electric field is imposed on the beams to compress the beams and reduce the radius of the spiral paths for enhancing the particle density necessary to produce collision of ions from one beam with ions from the other beam. Energy produced by the nuclear reactions resulting from such collisions is then extracted by means of heat exchange or deceleration processes. Beam compression to concentrate the ions is achieved through electrostatic focusing to establish and maintain two opposing beams in a reaction zone.

The invention involves the use of electrostatic field focusing of ions in a spiral or storage ring configuration so that particle confinement is independent of particle direction along the confinement path. Thus, two independent streams of particles can be propelled in opposite directions in the same space to maximumize fusion-producing collisions.

As heretofore mentioned, energy producing operations involving the present invention through choice of fuels can cause the operation to be free of hazards of undesirable radiation and avoid the production of toxic wastes that have characterized operations involving fission as practiced and thermonuclear fusion as envisioned. Because of this characteristic of the present invention, it lends itself to a wide variety of applications, particularly with reference to size and power ratings. For example, it is applicable to large power plant installations wherein very large reactor structures would be employed. Nevertheless, it may also be scaled to the size of drive systems for automobiles, aircraft or smaller vehicles. It provides the possibility of satisfying the utility needs for individual living quarters, such as homes or rooms on one end of the scale, while being able to supply apartment buildings or office buildings or complexes thereof or whole cities at the other end of the scale.

As will be hereinafter shown, several fusion reactions are known which involve the use of fuels which are unusually plentiful and readily available and have sources widely available throughout the world. The isoptope deuterium is plentiful in the sea. Helium three, boron and lithium are known to be in such supply as to warrant the description of them and deuterium as fuels which are essentially inexhaustible. By directing ions of such fuel at appropriate energies along collision paths, a measure of control is provided in energy production from fusion reactions that has heretofore not appeared possible in the various other avenues being pursued with the aim of producing power with net gain from fusion reactions.

Power sources using these principles may be viewed as including (a) a reactor structure, and (b) a long term fuel supply. It is appropriate to compare power sources utilizing these principles with conventional power sources which include the appropriate fuel supply for a similar term. When thus structured and compared, sources embodying the present invention will appear to be miniature in size. That is, a conventional power generator plus fuel supply will loom large in size compared to sources of the same power rating which embody the present invention. It may be that in some cases a reactor embodying the present invention, but without its fuel supply, may be as large in physical size or even larger than a conventional comparably rated power generator alone, i.e., without its fuel supply. However, the comparison of the reactor alone with a conventional power generator alone is not an appopriate comparison. The fuel supply must be also considered. Advantages which flow from the present invention will become apparent by noting that an automobile powered in accordance with the invention could carry a lifetime of fuel in bottles. A bottle of deuterium gas and a bottle of helium three gas having a total volume not exceeding the size of fuel tanks on current automobiles would suffice. The automobile might well reach the end of its life before exhausting an original fuel supply of such volume.

With the foregoing points in mind, embodiments of the invention and unique systems employed for carrying out fusion reactions will now be described.

BRIEF DESCRIPTION OF THE DRAWINGS

A more complete understanding of the invention and its advantages will be apparent from the following detailed description taken in conjunction with the accompanying drawings in which.

DETAILED DESCRIPTION

Figure 1:
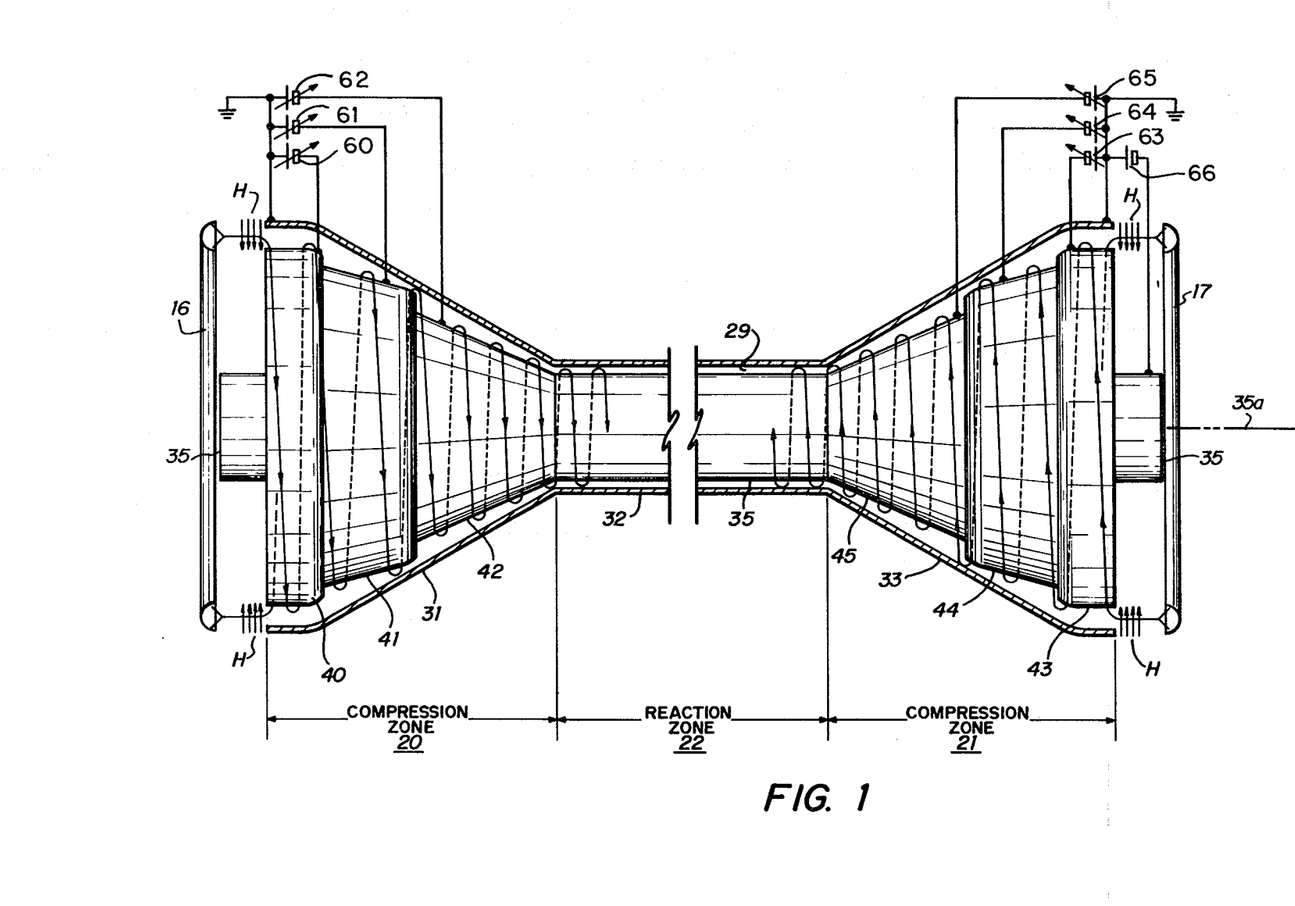
FIG. 1 diagrammatically illustrates the method of the present invention.

FIGURE 1

In the schematic illustration of FIG. 1, two circularly distributed ion sources 16 and 17 face each other. Sources 16 and 17 are positioned as to be symmetrical to a common axis 35a. Ion beams from sources 16 and 17 are accelerated parallel to axis 35a through a radial magnetic field H. The magnetic field forces the ions into spiral paths. Ions from source 16 travel in one direction along a spiral path and ions from source 17 travel in the other direction along the same spiral path. The spiraling beams are then subjected to electrostatic fields which cause progressive decrease in the radii of the spiral paths. More particularly, housing 31, 32, 33 is at a reference potential. Conical electode 40 is at a negative potential as provided by DC source 60. Conical electrode 41 is at a negative potential as provided by DC source 61. Conical electrode 42 is at a negative potential as provided by DC source 62. Similarly, the potentials on electrodes 43–45 and on a cylinder 35 are established from sources 63–66, respectively. After compression, the beams enter an annular reaction chamber 29 in which ions in the beam from source 16 travel in a collision course with respect to ions in the beam from source 17.

If the ions from source 16 are deuterium ions and ions from the source 17 are helium three ions, then the following well known reaction takes place:

$$^2D + {}^3He \rightarrow {}^4He + p + 18.3 \text{ MeV} \tag{1}$$

Two particles result, i.e., a helium atom and a proton, plus 18.3 MeV of energy. The particles at such energy no longer are confined by the field and, thus, may escape to impinge the chamber wall. The energy is then absorbed by carbon liners in reaction chamber 29. Heat may then be extracted through use of heat exchangers encasing the walls of reaction chamber 29.

The electric fields applied in the compression zones 20 and 21, FIG. 1, are such as to force the ions into very thin highly compressed dense beams which orbit at a very low pitch or grade. Thus, each ion makes many cycles of rotation as it traverses reaction zone 22, with head-on collisions resulting in fusion of the colliding particles.

It is to be understood that the entire system in which the ions are generated, compressed and reacted is evacuated and that the fields in compression zone 20 and compression zone 21 are so tailored as to cause the two beams to follow the same helical path through the reaction zone. The paths shown in FIG. 1 have been shown as having a very coarse pitch. It is to be understood that this is solely for the purpose of illustration. In actual practice the pitch would be very low so that in the rection chamber 29 there would be many passes of ions in the beams as one beam passes through the other at the same radius. As shown, the reaction chamber 29 is of circular symmetry at any given cross-section perpendicular to the axis of said paths and bounded by spaced apart outer and inner walls. A high incidence of head-on collisions is thus insured.

It will be further understood that the electric field between the outer housing 31, 32, 33 and the various electrodes are tailored in compression zones 20 and 21 to provide a gradual decrease in the diameter of the spiral paths as the beams travel from sources 16 and 17 to the points where they enter the reaction chamber 29. It is also to be understood that more or fewer discrete compression fields may be imposed on the ion beam. The specific configuration will depend upon particular design desired.

Figure 2:
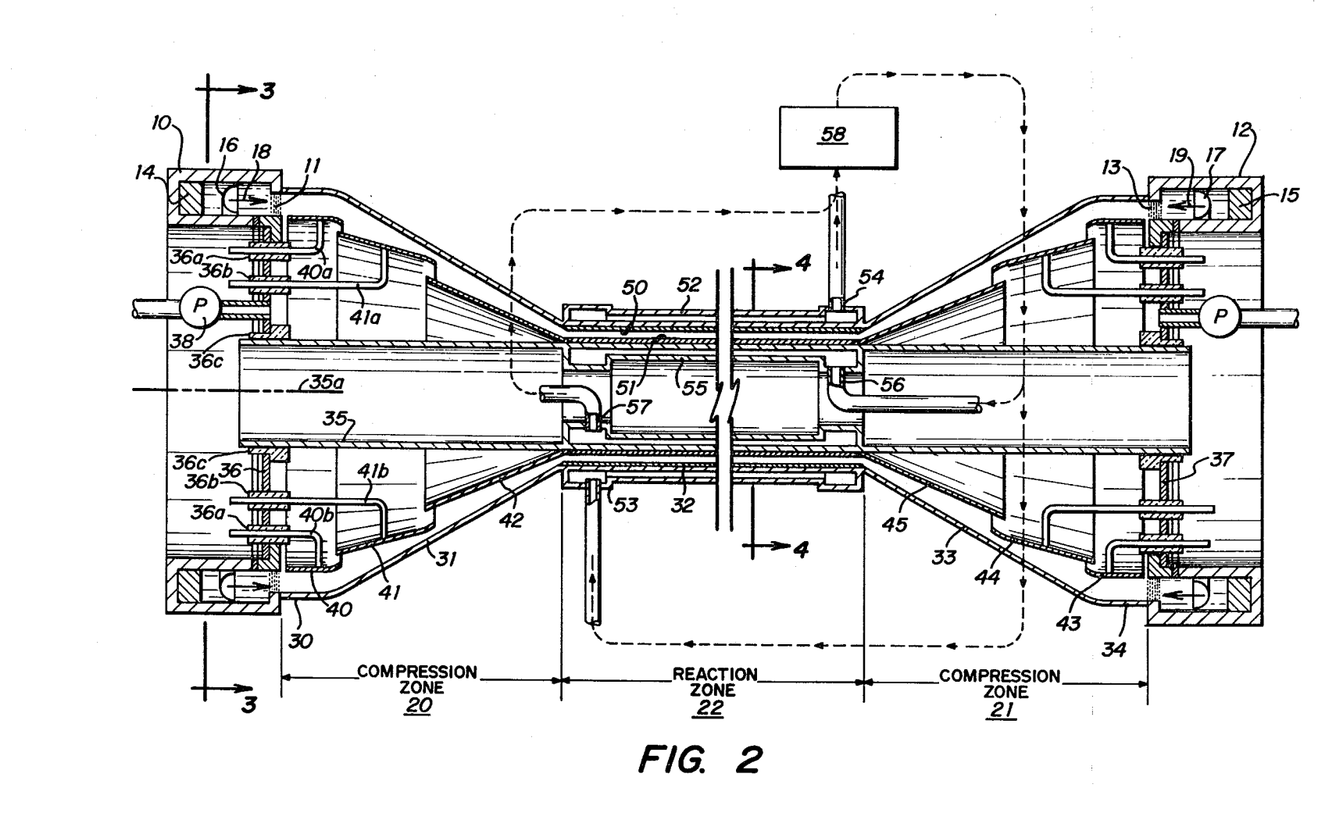
FIG. 2 is a more detailed sectional view of a reactor for carrying out the method of FIG. 1.
Figure 3:
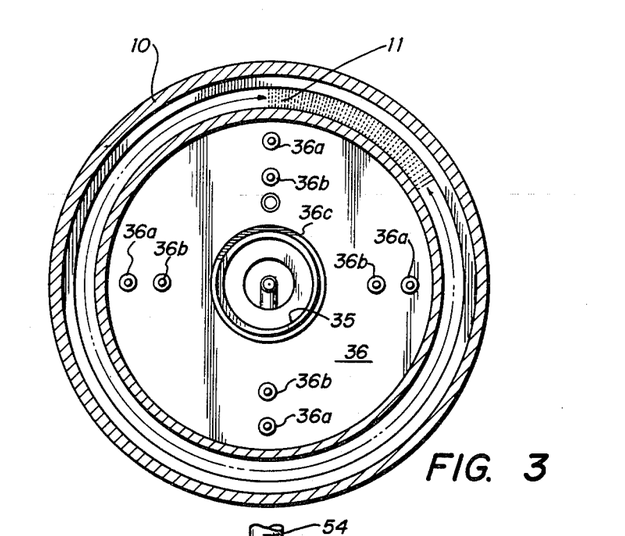
FIG. 3 is a sectional view of FIG. 2 taken along lines 3—3 of FIG. 2.
Figure 4:
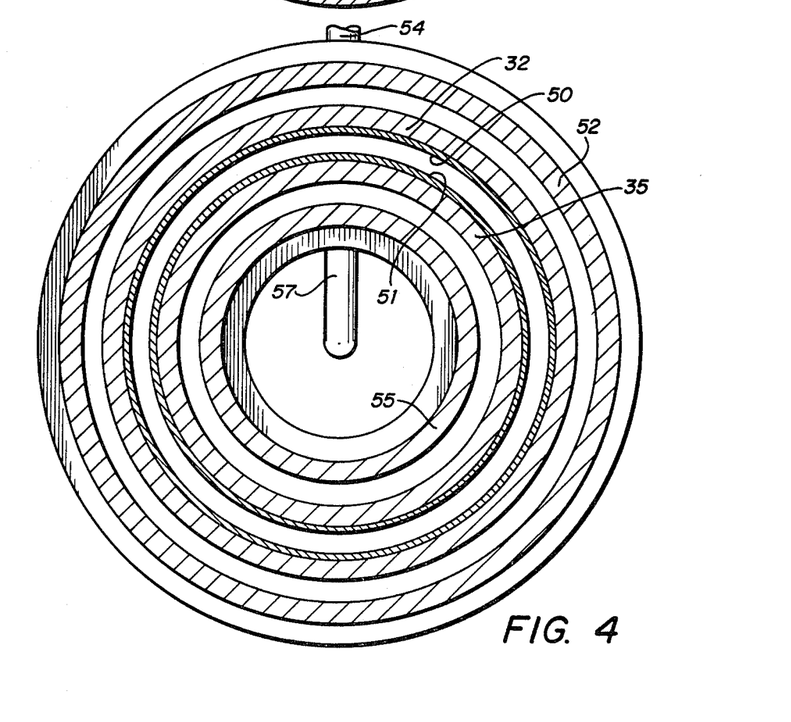
FIG. 4 is a sectional view taken along lines 4—4 of FIG. 2.

FIGURES 2-4

A reactor above described is illustrated in more detail in FIGS. 2-4. A hollow annular magnetic ring 10 of rectangular cross section has a circumferential gap 11 in one face thereof. Similarly, a second hollow annular ring 12 is provided with a gap 13. Rings 10 and 12 are spaced apart on a common axis with the gaps 11 and 13 facing each other. Ring 10 is provided with an electrical winding 14. Ring 12 is provided with an electrical winding 15. Controllable currents in windings 14 and 15 produce magnetic fields across gaps 11 and 13 to force the beam to follow spiral paths for introduction into the electric field confinement space with desired angular momentum as will be described.

Ion generator-accelerator source 16 is provided inside ring 10. Ion generator-accelerator source 17 is provided inside ring 12. As will be explained, source 16 may comprise a plurality of ion beam sources at angularly spaced positions around the circumference of ring 10. A like number of sources angularly spaced around the interior of ring 12 may be used. In such case, many beams, as represented by arrows 18 and 19, are accelerated through gaps 11 and 13, respectively. Magnetic fields across gaps 11 and 13 will cause the beams to be deflected so that rather than following paths in the direction of arrows 18 and 19 they are forced into spiral paths as they move away from gaps 11 and 13. As will be further explained, electric fields will be imposed on each beam to force the spiraling beams to follow paths of progressively decreasing diameter. As the diameter decreases the ion density increases. The two oppositely traveling high density beams of ions will then pass through a cylindrical reaction zone where head-on collisions take place.

It will now be apparent that the structure between rings 10 and 12 forms (a) a first compression zone 20 adjacent ring 10, (b) a second compression zone 21 adjacent ring 12, and (c) a reaction zone 22 between compression zones 20 and 21.

An outer housing is provided with cylindrical section 30, a conical section 31, a cylindrical section 32, a conical section 33, and a cylindrical section 34. Sections 30-34 as shown are integral one with another with the central section 32 being cylindrical.

The inner central cylinder 35 extends coaxially of the compression zones 20, 21 and the reaction zone 22. A closure plate 36 is secured between ring 10 and the end of cylinder 35. Similarly, an end closure plate 37 is secured between ring 12 and the end of cylinder 35. With such closure plates, the space inside the housing 30-34 and outside the central cylinder 35 can be evacuated as by vacuum pumps 38. Two sets of electrodes symmtrical to the axis 35a of the system are provided, one set being located in each of the compression zones 20 and 21. More particularly, a first electrode 40 is generally cylindrical in shape. The end of electode 40 opposite ring 10 is slightly conical. A second electrode 41 is of conical shape with an internal angle les than the angle of the conical section 31. A third electrode 42 in the form of a truncated cone is secured to cylinder 35 at the entrance to the cylindrical reaction zone 22 and extends towards ring 10 with the end thereof inside the small end of electrode 41. Electrode 41 extends toward ring 10 with the end thereof inside the end of electrode 40. In a similar manner, electrodes 43, 44, and 45 are mounted in the compression zone 21.

The inner wall of the cylindrical housing section 32 is provided with a lining 50 of carbon, preferably pyrolitic carbon. The outer surface of the cylindrical cylinder 35 is provided with a like lining 51 of pyrolitic carbon.

A cylincrical heat exchange jacket 52 surrounds the cylindrical housing section 32 and is provided with a fluid inlet 53 and a fluid outlet 54. A heat exchange jacket 55 inside the cylinder 35 spans reaction zone 22 and is provided with an inlet channel 56 and an outlet channel 57. Jackets 52 and 55 are flow connected to a utilization unit 58.

As shown in FIG. 2, the electrode 40 is positioned near the end of ring 10 adjacent gap 11 and is supported by electrically conductive rods 40a and 40b, which extend through closure plate 36 by way of insulators 36a. Four supporting rods are employed for electrode 40, only two, rods 40a and 40b, being shown in FIG. 2. Similarly, electrode 41 is supported by four rods 41a, 41b which also pass through insulators in plate 36. The end of cylinder 35 is secured to plate 36 by way of insulators 36c.

In FIG. 3, the ring 10 is shown in sectional view. Plate 36 is of disc or washer shape and with the rods 40a-40d, 41a-41d and the end of cylinder 35 extending therethrough. While only one flow channel has been illustrated leading to the vacuum pump 38 of FIG. 2, it will be apparent that a manifold may be provided leading from several passages through end plate 36 to facilitate evacuation.

The supporting conductor rods 40a-40d and 41a-41d, as well as the central cylinder 35, provide for the application of DC voltages to the electrodes 40, 41, and 42 in order to force ions from source 16 to follow a spiral path of progressively decreasing radius until they enter the cylindrical reaction zone 22.

FIG. 4 is an enlarged sectional view of the reaction zone 22. The inner cylinder 35 supports an internal heat exchange jacket 55 around which a flow of suitable heat exchange fluid is established during operation of the system. The outer wall of cylinder 35 is coated with a pyrolitic carbon layer 51 for absorbing the energy of the particles produced in connection with fusion reactions in the reaction zone 22. Similarly, the outer cylinder 32 extending through the reaction zone 22 has an internal coat of pyrolitic carbon lining 50 for absorption of energy of the reaction products. Heat exchange jacket 52 encircles cylindrical housing 32 in coaxial spaced relation for flow therethrough of suitable cooling fluid.

Figure 5:
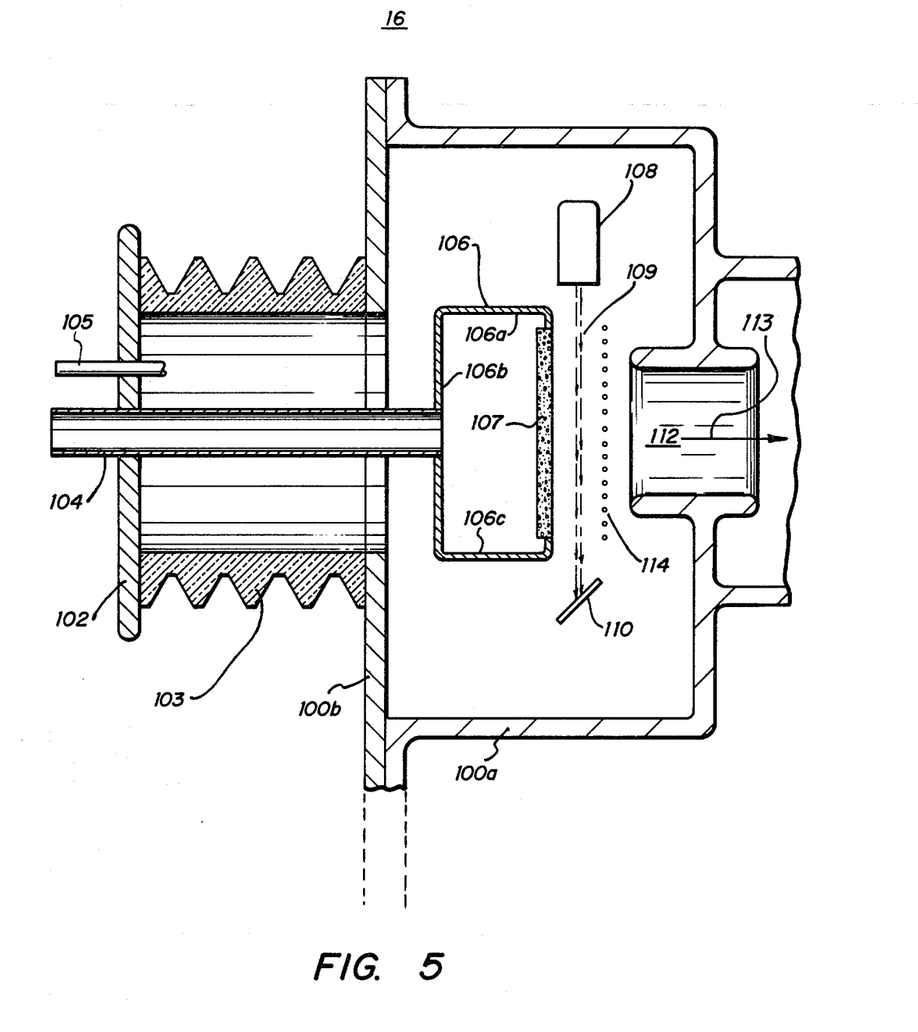
FIG. 5 illustrates a portion of a suitable ion beam generator.
Figure 6:
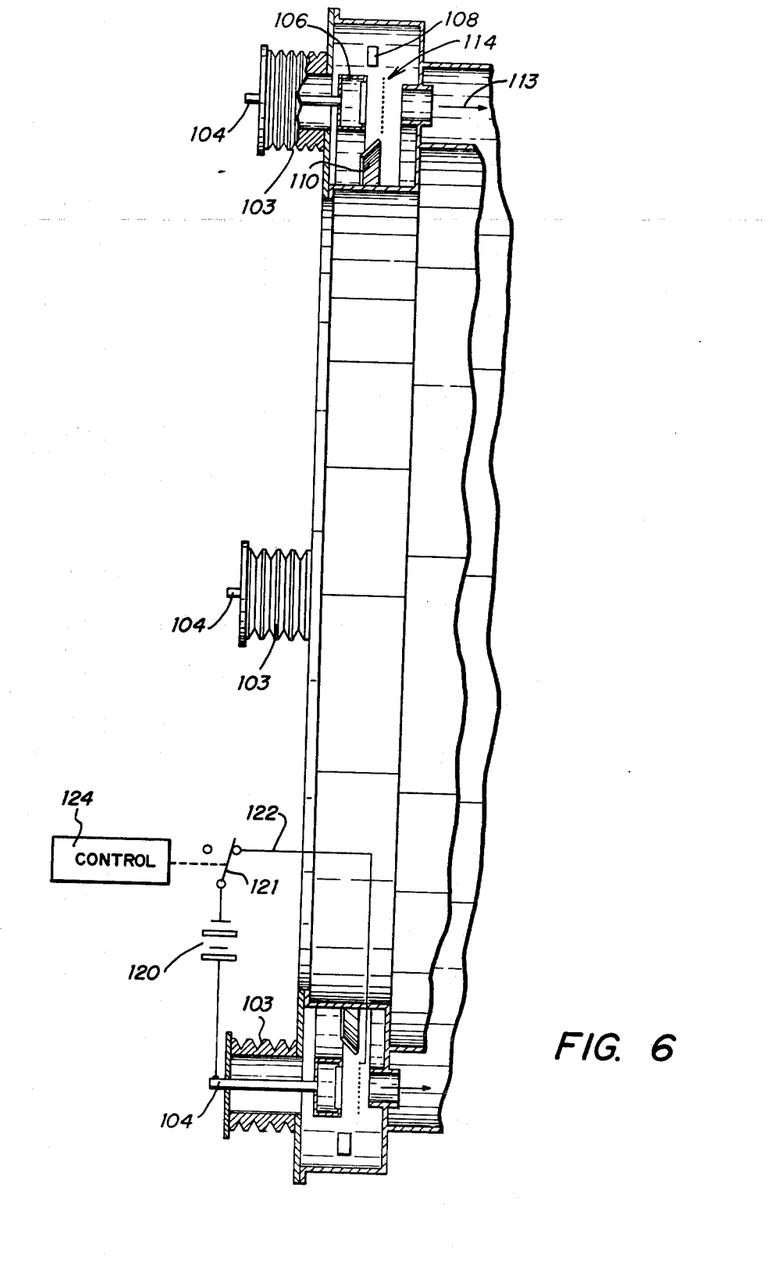
FIG. 6 further illustrates the ion beam generator of FIG. 6.

FIGURES 5 and 6

FIG. 5 schematically illustrates one form of a suitable source 16 of FIG. 1 wherein a beam of ions of substantially cylindrical configuration is produced. The system of FIG. 5 is a sectional view of a cylindrical source to be housed within magnetic ring 10 of FIG. 1. FIG. 6 shows the entire source in section, on a reduced scale.

Source 16, FIG. 5, includes structure forming a circular chamber 100 which includes an annular ring cup 100a and a closure ring 100b. Positioned behind closure ring 100b is a support disc 102 which is mounted on and supported by closure ring 100b by a supporting insulator 103. A gas inlet tube 104 extends through the support disc 102 and extends into and supports a circular feed gas manifold 106. A cable 105 passes through a fitting, not shown, in disc 102 to supply power and control voltages to electrodes of source 16.

Feed gas manifold 106, like chamber 100, is a ring formed by three impervious walls 106a, 106b and 106c and a permeable front wall ring 107 which is a permeable barrier ring through which gas used in the system may pass. Immediately in front of the permeable barrier ring 107 is an ion extraction grid 114. A plurality of ion exit channels 112 are formed in the bottom portion of the circular cup 100a. A circular electron gun 108 is positioned as to direct a sheet of electrons 109 radially between barrier ring 107 and extraction grid 114 toward an electron catcher 110. The elements of FIG. 5 described as circular or annular are mounted symmetrically with respect to axis 35a of FIG. 2. They include annular cup 100a, closure ring 100b, feed gas manifold 106, barrier ring 107, electron gun 108, electron catcher 110 and ion extraction grid 114.

Ion exit channel 112 may be a continuous ring-shaped slot in the bottom of chamber 100 or it may be substantially continuous by providing a plurality of circular holes which are almost tangent one to another. Alternatively, it may comprise a plurality of slits arrayed about the axis 35a of FIG. 2.

In operation, a suitable gas is introduced through inlet tube 104 into the gas manifold 106. The atoms of the gas then pass through the barrier ring 107 at a rate determined by the pressure of the gas in the manifold 106. The atoms of the gas emerging from the barrier strip are bombarded by electrons in the beam 111 to produce ions from the gas. A positive potential on the extraction grid 114 accelerates the ions to form an ion beam 113 to repel electrons back toward the barrier ring 107.

Referring now to FIG. 6, it will be noted that in the system thus far described four gas inlet tubes 104 are provided, three of which are shown, along with their three support insulators 103.

Further, in FIG. 6 it will be seen that the manifold 106, electron gun 108, electron catches 110, and the ion extraction grid 114 are all of ring-like construction. Ion source 16 of FIGS. 5 and 6 will be mounted in the magnetic ring 10 of FIG. 2, whereas a similar source is mounted in magnetic ring 12 to comprise the source 17 or FIG. 2.

Each of the ion sources 16 and 17 comprises a supply of feed gas, or in the alternative a suitable feed liquid, together with a source of ionizing electrons that produce a plasma from gas released through the permeable barrier ring 107. A suitable voltage applied to the extraction grid 114 extracts ions from the plasma and focuses them in a columnated exit beam 113.

Ion sources 16 and 17 each produce a thin sheet of ions of cylindrical configuration. The axis of the beam coincides with the axis 35a of the reaction region. Thus, the ion paths form a substantially cylindrical continuum. Ions issuing from source 16 and 17 are controlled so that all travel within a common cylindrical annulus with appropriate energies. The beam from source 16 travels in direction opposite the beam from source 17.

In the example shown in FIGS. 5 and 6, the porous barrier ring 107 which limits the feed of gas can be made of porous tungstun, molybdimum, tantalum, carbon, or conductive ceramic. If hydrogen isotopes are used, paladium, titanium, zirconium or indium can be used as barrier material. Electron gun 108 is so positioned as to produce a sheet of electrons flowing inwardly and radially across the face of the porous barrier ring 107. The energy of the electrons is selected to produce copious ionization in the gas issuing from the barrier ring 107. While suitable sources of such electrons are well known, it is noted that an indirectly heated cathode may be used where the cathode is made of nickel coated with oxides or carbonates of strontium, barium, calcium or rare earth elements. The electron gun 108 preferably will be maintained at a negative potential relative to the gas manifold 106. The negative voltage is adjusted as to be near the peak of the ionization cross section curve for the gas employed. Voltages of the order of 100 volts would be involved. The plane of the electron beam is selected so as to be substantially perpendicular to the accelerating electrical fields in the plasma chamber as produced by the voltages on ion extraction grid 114.

In order to obtain an adequate current of positive ions the electron current issuing from the electron gun is preferably larger than the desired ion current, particularly if the ions have more than one unit charge. The pressure in the supply chamber 106 is of the order of between 0.01 and 10 atmospheres. The ion extraction grid 114 directly in front of the plasma region is of the order of 10 kilovolts negative with respect to the barrier ring 107. This causes positive ions in the gas plasma to be drawn through the grid. An accelerating voltage is applied between manifold 106 and the structure forming the exit channel 112. The exit openings in channel 112 preferably are aligned with corresponding openings in the ion extraction grid 114.

The electric potential of support disc 102 and feed gas manifold 106 may be of the order of up to 200 kilovolts negative with respect to the annular chamber 100. The pressure of the gas plasma in front of gas barrier 107 would be controllable and in the range of from 0.1 to 20 millitorr. In a modification of the invention, the cylindrical ion beam of FIGS. 5 and 6 is not used. Rather, a plurality of spaced apart point sources is utilized. Such sources would be arrayed at uniform radii about the axis 35a of FIG. 2. In appearance they would be as shown in FIG. 6, understanding that plural manifolds, electron guns, extraction grids and exit channels would be provided to produce a plurality of pencil ion beams.

Figure 7:
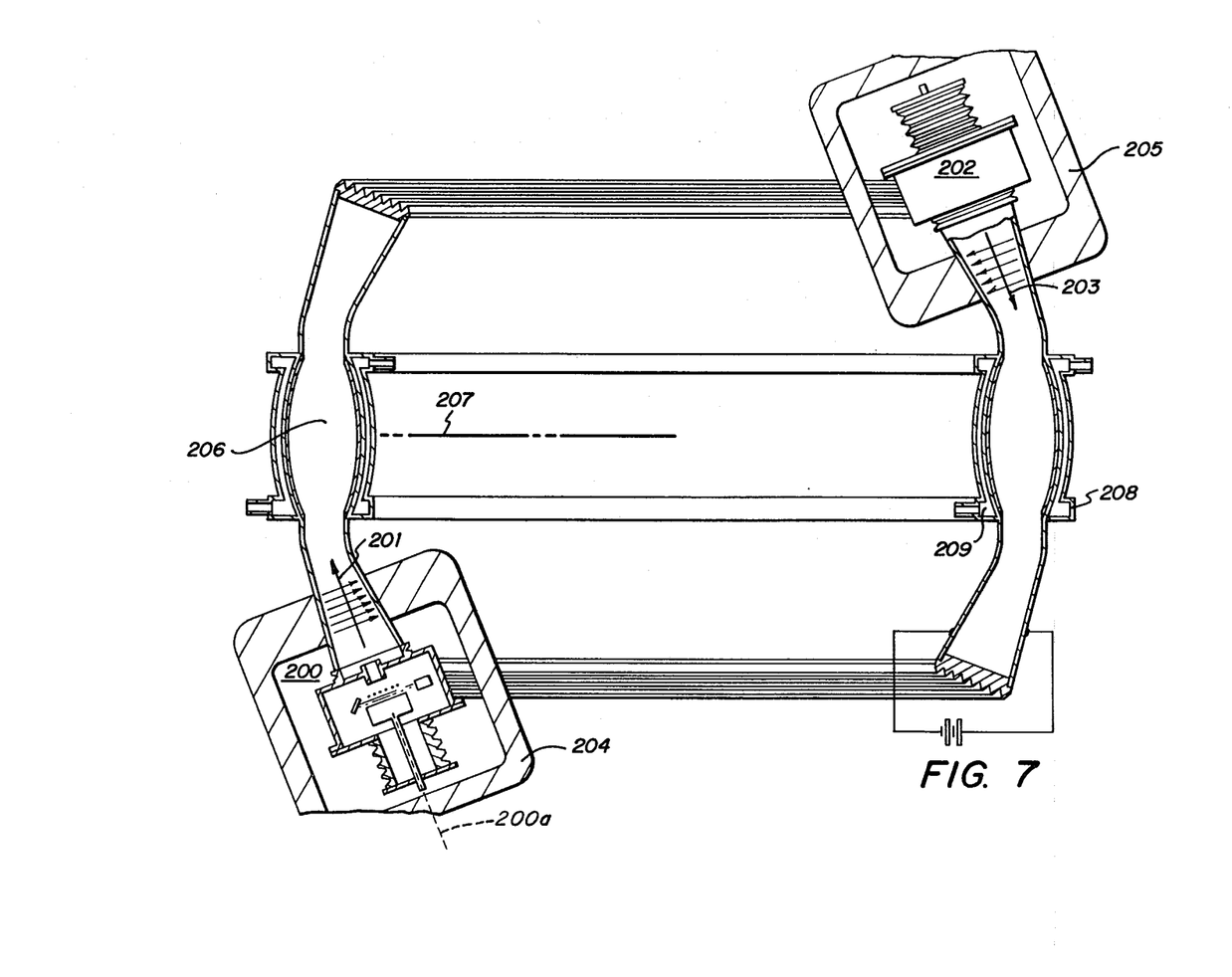
FIG. 7 illustrates a modification of the invention.

FIG. 7

FIG. 7 illustrates a further modification for carrying out the present invention with beams of ions spiraling along collision courses. In the systems described in connection with FIGS. 1-6, the current density of the positive ion beams was increased by radial compression. Such compression is characteristic of the operation of the systems of FIGS. 1-6, whether either cylindrical ion beams or arrays of pencil ion beams are employed.

In contrast, in the system of FIG. 7 the pitch or grade of the helix traced by the ions when they are moving in a helical path is reduced to the point that the grade vanishes. As a result, many ion paths are wound very closely together in a very short reaction region.

Referring to FIG. 7, a pencil beam source 200 is symmetrical to the axis 200a, and thus, provides a pencil beam 201 of ions rather than a cylindrical beam. A second source 202 provides a second pencil beam 203. The beam 201 passes through a magnetic field from a magnet 204. Beam 201 is thus caused to change direction as to spiral on a very low grade or tight spiral in an annular chamber 206. Annular chamber 206, rather than having cylindrical walls, has walls shaped to cause a focusing such that as the spiraling beam 201 approaches the median plane 207 the pitch vanishes. The same is true of the beam 203 as it approaches the median plane 207. At the median plane the beam 201 is traveling in one direction and the beam 203 is traveling in an opposite direction, so that the streams of ions become highly concentrated as they travel on collision courses at or about the median plane 207.

Thus, rather than use radial compression, this modification of the system involves axial compression, reducing the pitch or grade of the helix traced by the ion beams for increasing the concentration of ions at the median plane 207, whereby the collision rate becomes very high.

Heat energy may then be extracted via fluid flowin heat exchanger jackets 208 and 209 as was described in connection with FIGS. 1-6.

The ion sources of FIGS. 1-5 and of FIGS. 6-7 have involved use of an electron beam to ionize the plasma. It will be appreciated that because of the relatively low energy involved, a cyclotron could be employed in place of the ion sources of FIGS. 6 and 7. In this environment, the cyclotron could be a relatively small unit.

The system of FIGS. 1-5 or the system of FIGS. 6-7 have been described as in continuous operation. This would be true as long as operating conditions are maintained including application of suitable voltages to the extraction grids. There may be circumstances under which the system is to operate intermittently rather than continuously. This will be appreciated when it is recognized that the efficiency of the reaction system is dependent upon the square of the number of ions in the reaction zone rather than being a linear function of that number.

In FIG. 6 an accelerating voltage from a source 120 is connected at its positive terminal to the gas inlet tube 104. The negative terminal is connected by way of a switch arm 121 to a switch terminal from which a line 122 extends and which is connected to the extraction grid 114. The negative voltage on the extraction grid attracts the ions in the plasma zone and directs them toward the exit openings. For continuous operation, the switch 121 would be maintained closed to complete the circuit through conductor 122. If intermittent operation is desired, a controller 124 periodically will close switch 121 at rates and for intervals which may be variable, depending upon power demand, so that the ion beams would be produced only intermittently.

Figure 8:
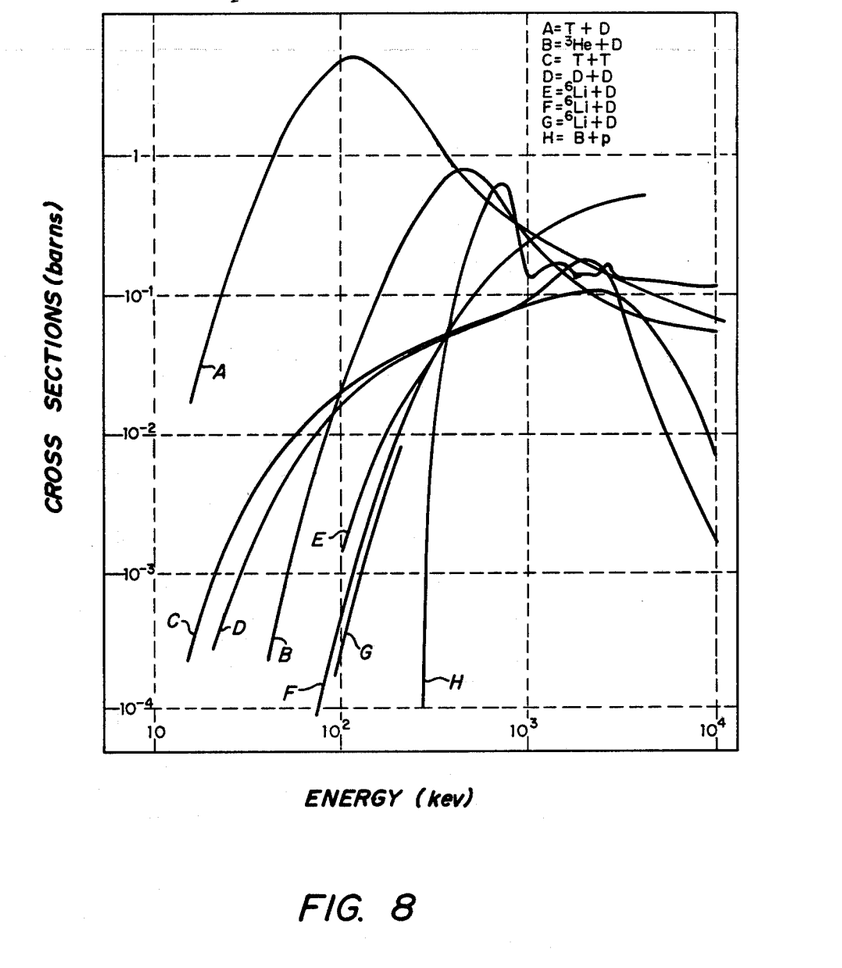
FIG. 8 is a graph showing the cross section for various reactions that may be employed.

FIG. 8

FIG. 8 illustrates cross sections for several fusion reactions. Particle energy, in electron volts, is plotted on the ordinates. The reaction cross section, in barns, is plotted along the abscissa where each barn is $10^{-24}$ cm$^2$.

FIG. 8 indicates that fusion of deuterium and tritium is probably the easiest reaction to manage. More particularly, nuclei at 20 KeV of deuterium and tritium have, from FIG. 8, curve A, a fusion cross section of about 0.1 barn. Particles having relative energy of 115 KeV have a fusion cross section up to 5 barns. The DT reaction produces a neutron of relatively low energy, i.e.: 3.2 MeV. Neutron production may or may not be desirable, as will be discussed later.

The reaction represented by curve B where helium three and deuterium are employed is preferred. In that reaction a helium atom and a proton are produced plus 18.3 MeV of energy per reaction.

The cross section for the reaction between lithium and deuterium to produce two helium atoms is only partially shown and is not further available. However, it appears to be attractive, the reaction being:

$$^2D + ^6Li \rightarrow 2\,^4He + 22.4 \text{ MeV} \qquad (2)$$

Other modes of operation may prove to be equally or perhaps more desirable. For example, note the reaction between boron ions and protons from the curve H of FIG. 8.

It should be understood that the data shown in FIG. 8 comprises the cross sections for various reactions in a thermonuclear case, i.e., where particle velocity is randomly directed. It is to be understood in the present case where the motion is not random, but wherein particle velocities are in head-on collision courses, the cross section is significantly greater by an amount approximately equal to the square root of 6.

From the foregoing it is shown that nuclear particles are directed and controlled to produce head-on collisions in opposing beams of suitable positive ions. This is in contrast with the usual concept of plasma which is thermal, i.e., random, and includes undesirable electrons which radiate profusely, but are necessary for plasma neutralization.

Thermal plasma which is hard to contain and which is inefficient for energy release is avoided. Such inefficiency exists because only a small fraction of positive ions in the thermal plasma have the right conditions for fusion, namely, that part of Maxwellian distribution which has the right kinetic energy and relative direction.

In accordance with the present invention, selected positive ions move in helical paths, the grades of which are independently controllable, traveling at the same radii and in opposite directions, hence optimal for head-on collisions.

A most important property of the focusing employed is that beam radii are stable. That is, any particle deviating from the radius is automatically pulled back into the stable radius. Thus, the ions are forced to form a thin sheet of oppositely moving helical beams. Since the helical grade can be made as small as desired and is independently controllable, the interaction length of the opposing beams can be made very large, hence the collision probability can be made to approach unity.

The velocities can be selected to assure operation at the point of the maxima in the fusion reaction cross section. Most head-on or near head-on collisions lead to fusion with attenant release of fusion energy. Maxima in the reaction cross sections for nuclei under consideration are 4-10 times larger than coulomb scattering cross sections so that only a small fraction of the nuclei undergoes coulomb scattering. Of those coulomb scattered particles the ones that undergo a small-angle scattering will go back into the beam due to the aforementioned stability. Between the small angle and fusion cross section some coulomb scattered particles will hit the walls and get lost, but their energy is not entirely lost since they contribute to the extracted heat.

Particles that pass through the reaction region without interaction are still directed beams. These directed beams can be used for direct electrical energy conversion with high efficiency, hence they should not be considered lost.

The energy conversion efficiency from heat to electricity or to mechanical energy can be as high as 45% to 50%. Thus, the ratio of reaction output to beam input energy may be the order of 61 to 1. The reaction:

$$^3He + ^2D \rightarrow ^4He + ^1p + 18.34 \qquad (3)$$

gives this ratio. In such case, about 40% to 45% of total fusion energy is recoverable.

It is known and can be shown that the stability condition for focusing a particle is given by the equation:

$$r_0^2 V_0^2/r^3 - v_0^2/r = d^2r/dt^3 \qquad (4)$$

where:
 $r_0$ = the stable radius
 $v_0$ = particle velocity
 r = the instantaneous radius If a particle deviates in either direction from the stable radius $r_0$ for velocity $v_0$, the particle is pulled back to the stable orbit $r_0$.

The small oscillations die down by means of dissipative currents at the walls and in the pyrolytic carbon coating. Thus, stable and extremely dense beams of particles are produced.

As above noted, the beam thickness can be very small and particle density can be made very large by means of independently controlling the ion sources and the ion velocities.

It is to be noted that space charge does not lead to beam spreading because as focused the wall develops a charge density $$q = -e\phi^2\epsilon_0/2\pi r_a^2 \quad (5)$$

and, thus, overall beam spread due to space charge is prevented. The space charge effect is compensated by q. The only remaining particle deviations from the beam are due to the coulomb scattering of individual particles due to the granular nature of the charges. Under these conditions the charge density $\rho$ for positive ions is given by the equation:

$$\rho = +Ze\epsilon_0\phi^2/2\pi^2 Mr^4 \quad (6)$$

where:
  Z is the charge-number of the positive ion;
  $\phi$ is the magnetic flux which originally guides the ion beam into the circular Harris orbit;
  M is the mass of the particle; and
  r is the radius of the orbit.

Charge density, and thus particle density, depend upon the inverse of $r^4$. This particle density increases by a large factor by starting with a large radius and then compressing the beam to a small radius. The compression is achieved by bending the ion beam, which is originally obtained via a steady electric field. The radial magnetic field is the term $\phi$ in equation (6). The beam is fed into the small stable radius in zone 22, FIG. 2, as controlled by electrostatic focusing. Since $e\phi^2 Mr^4$ can be very large, the particle density can be made very large. This means that the reaction rates can be made large, leading to extraction of large useful power.

While there may be widely varying embodiments of the invention, the following is given by way of example:

The diameter of the ion source may be 2 meters. The length of cylindrical reaction zone may be 2 meters.

The ion sources and their coupling to the reaction zone may total 4 meters so that the total size of the reactor could be 2 meters high, 2 meters wide and 6 meters long.

In such reactor the stability condition permits formation of a beam thickness as low as $\delta r = 100$ Å at a radius of $r_0 = 10$ cm in the reaction zone 22.

Assume that the ion source 16, FIG. 2, produces 1 ampere of 200 KeV singly charged deuterium ions in the form of a cylindrical sheath of $10^{-2}$ cm thickness at the source radius of 1 meter. Then at the 10 cm radius of the reaction section 22, the sheath thickness will be compressed down to $10^{-6}$ cm, i.e., 100 Å.

The pitch of the ion path in the reaction zone can be made to be $1.25 \times 10^{-2}$ cm. The resultant current density in the ion sheath will then be $8 \times 10^7$ amperes/cm².

Assume also that source 17, FIG. 2, produces 2 amperes of 400 KeV doubly charged helium three ions at the other end of the reactor of FIG. 2.

Under these conditions of current density and a nuclear reaction cross section of 1.9 barns, the two circumferential counter flowing beams will be largely consumed while transversing the reaction zone 22 of the reactor. The fusion energy released in the process will be about 18.3 megawatts, which averages out to be about 750 watts/cm² (thermal) in the 2400 cm² walls of the reaction chamber 35.

Overall system size depends on not only the reactor, but also the thermal power plant. It may be desired to produce neutrons. In such case shielding must be employed which affects physical plant size. If the deuterium-tritium reaction of equation (1) is employed, the system could be used as a copious source of high energy neutrons. In such case, the energy could be utilized to bombard thorium or $U_{238}$ for producing fissionable materials. Thus, a plant can be operated both as a neutron source, as well as a power plant. Because neutrons are valuable and have a variety of uses, it may be desirable to use materials indicated which lead to neutron production while at the same time producing heat energy. Extraction of heat from the system may be achieved by circulating steam, mercury vapor, helium or air through units such as heat exchangers 52 and 55, FIG. 2. In the latter case, the system could operate as a heat source for a jet engine.

The electric field across the cylindrical reaction zone 22 which holds the ions at their stable radii is known from equation:

$$E_r = (H/Ze)r_0 \cdot (d\theta/dt)^2 = M/Ze \cdot v_0^2/r_0 \quad (7)$$

For example where:
  $v_0 \approx 5 \times 10^8$ cm/sec.,
  $r_0 = 10$ cm,
  $M = (2 \text{ to } 10) \times 10^{-24}$ grams,
  $Z = (1 \text{ to } 5)$, and
  $e = 4.8 \times 10^{31 \, 10}$ esu.

Thus, $E_r \approx (5 \text{ to } 25) \times 10$ esu cm, or about 15,000 to 75,000 volts/cm. Because the final beam thickness may be much smaller than a millimeter, the electric field can be applied across a gap of only one millimeter and, thus, the voltage required from the guiding power supply would range from 1500 to 7500 volts.

In obtaining beams of high density positive ions, an operation related to what is known in the electron art as Harris focusing is employed. Harris focusing is of the type described in W. W. Harmon, *Fundamentals of Electronic Motion*, McGraw-Hill Book Company, Inc., 1953, pages 161 and 162.

As above described, the ion beams are deflected from an initial path parallel to the axis of 35a, FIG. 2, to paths which are circumferential or of spiral shape. In FIG. 2 electromagnets are employed for establishing the magnetic fields through which the beams are deflected. It is to be understood, of course, that permanent magnets may be used, either alone or with auxiliary coils associated therewith for adjusting the precise pitch desired on a given beam.

It will also be appreciated that in the case of the reaction of equation (3) where helium three and deuterium are employed, the ions in the respective beams will have different masses. In order for them to be confined within the reaction zone 22 at the same radius, the initial acceleration of the ions will differ. More particularly, as an ion is forced into a helical orbit the centrifugal force tends to cause it to travel tangentially out of orbit. The electric fields imposed restrain the ions in the orbit by reaction between the field and the charge on the particle. For example, the deuterium ion has a mass of 2 and a charge of 1. Helium three has a mass of 3 and a charge of 2. In utilizing deuterium and helium three in accordance with the present invention, the helium three ions would be given the greater initial velocity so that under the influence of the same electric field in the reaction zone 22 the helium ions and the deuterium ions would occupy the same space, i.e., would spiral at the same radii.

It will also now be appreciated that the systems of FIG. 2 and FIG. 7 operate by producing collisions between streams of ions which travel not only in opposite directions with reference to their circumferential path, but also advance from opposite directions toward the reaction zones. Either of the two systems of FIG. 2 and FIG. 7 may be modified so that the two beams advance to the reaction zone in the same senses, while circumferentially traveling in opposite senses, thereby causing the ions to travel in head-on collision courses.

Figures 9, 10:
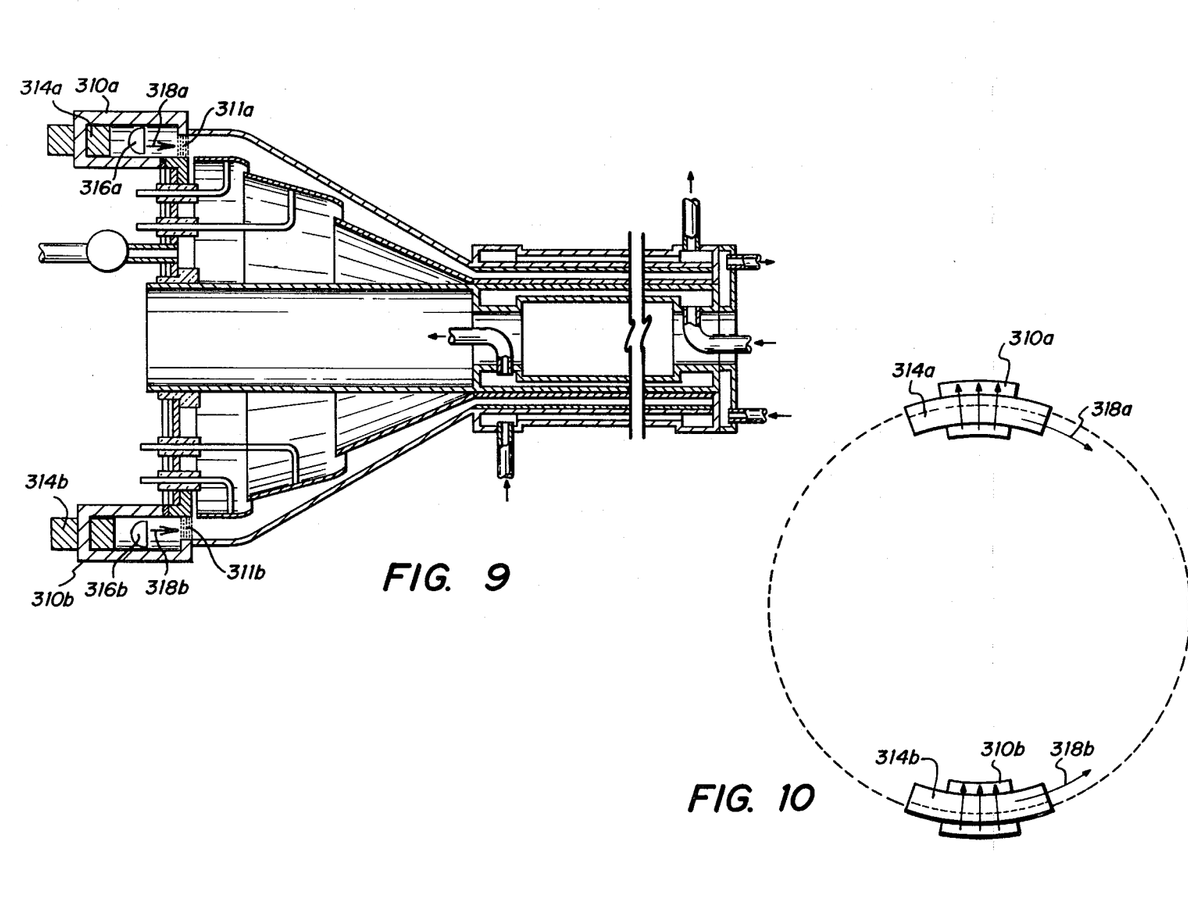
FIG. 9 is a modification of the system of FIG. 2.
FIG. 10 is a partial end view of the unit of FIG. 9.

FIGS. 9 and 10

FIGS. 9 and 10 illustrate a modification of the system illustrated in FIGS. 1-5. More particularly, as above noted with reference to FIGS. 1-5 a circumferential beam from source 16 advances in one direction along the axis 35a. A circumferential beam from source 17 advances in the opposite direction along to the axis 35a. The beam from source 16 spirals in one direction, whereas the beam from source 17 spirals in the opposite direction.

In contrast FIGS. 9 and 10 illustrate a single ended system which utilizes distributed sources at one end rather than continuous sources at opposite ends. A localized ion source 316a is positioned inside a magnet 310a to produce a beam 318a of limited circumferential extent. Ion beam 318a passes through a magnetic field 311a in a gap in magnet 310a to cause beam 318a to be deflected into a circumferential path. A second source 316b is positioned inside a second magnet 310b to produce a beam 318b of limited circumferential extent. Beam 318b passes through a magnetic field 311b to deflect the beam into a circumferential path.

The magnetic field 311a will be opposite in direction to the magnetic field 311b so that beams 318a and 318b spiral in their circumferential paths in opposite directions. The magnetic fields may be produced by energizing coils 314a and 314b in opposite senses. Thus, the beams will be traveling in collision courses as they are compressed into a smaller diameter for injection into the reaction zone 22 shown in FIG. 2.

Except for the character of the sources of the ion beams and the magnetic fields deflecting the same into circumferential orbits, the other components of the system of FIG. 9 may be the same as above described in connection with FIGS. 2-4.

Referring to FIG. 10, two such sources, 310a and 310b, have been shown, each of which, may be included in the system of FIG. 9. More than two sources may be used, depending upon the requirements of the system. The beam compression in compression zone 20 and the energy extraction by reason of fusion producing collisions in zone 22 can be carried out as previously described.

Figure 11:
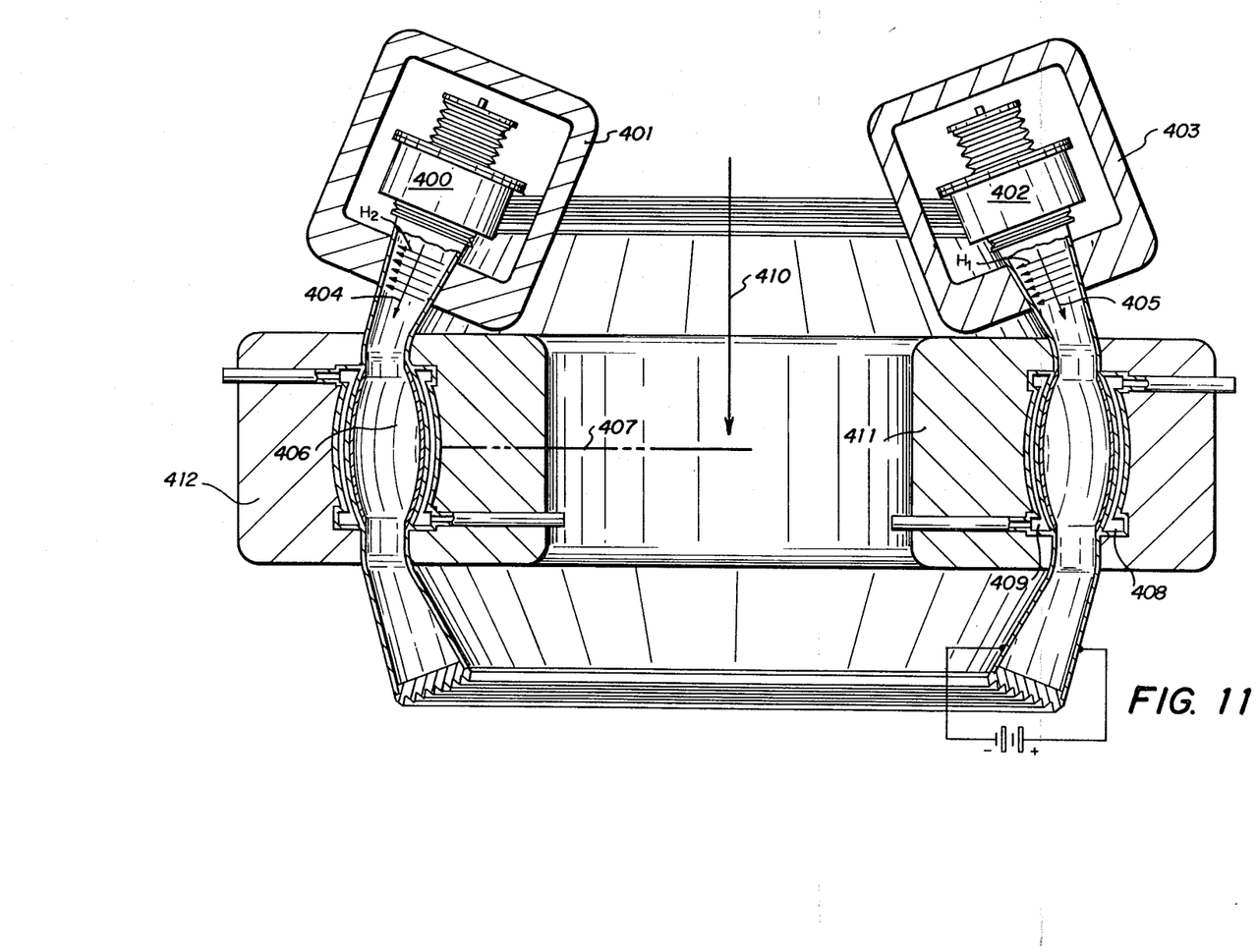
FIG. 11 is a modification of the system of FIG. 7.

FIG. 11

FIG. 11 is a modification of FIG. 7, wherein a pair of sources 400 and 402 are associated with magnets 401 and 403 and produce beams 404 and 405 which orbit in opposite directions in reaction cavity 406. The beams traveling in opposite directions with reference to their circumferential travel advance in the same direction, i.e., in the direction of arrow 410. As in FIG. 7, the shape of the electric field in the reaction cavity 406 is such as to cause the beams to arrest their advance and thus axially compress the ions within the reaction cavity. Jackets 408 and 409, as in FIG. 7, are provided for extraction of heat produced by the fusion reactions.

In FIG. 11 assume that a deuterium-tritium reaction is employed. In such case, an inner blanket 411 and an outer blanket 412 of neutron capturing material is provided to utilize neutrons produced in the reaction zone. The blanket may be lithium for production of tritium or may be $U^{238}$ or $Th^{232}$ to make fissionable fuels.

Having described the invention in connection with certain specific embodiments thereof, it is to be understood that further modifications may now suggest themselves to those skilled in the art and it is intended to cover such modifications as fall within the scope of the appended claims.

I claim:
1. A charged particle machine which comprises:
   (a) a pair of spaced apart sources of charged particle beams for producing two circumferential oppositely traveling beams;
   (b) means to direct said beams along spiral paths having common axes and radii and thus pass through common space;
   (c) coaxial cylindrical electrodes spaced apart to define a cylindrical annulus including said common space;
   (d) means for application of voltages between said electrodes for establishing a D.C. radially directed electric field along said common axis and in said space to compress said beams and reduce the radii thereof and to oppose the centrifugal forces on said beams as they orbit in said space to maintain high particle density in said space in said cylindrical annulus to promote collisions between oppositely traveling ions in said beams; and
   (e) means responsive to the effects of collisions between ions in said beams.
2. A charged particle machine which comprises:
   (a) a pair of spaced apart axially aligned sources of charged particle beams for producing two circumferential oppositely traveling beams;
   (b) means to advance said beams toward each other along spiral paths having common axes and radii and thus pass through common space;
   (c) coaxial cylindrical electrodes spaced apart to define an annulus including said common space, which annulus is of smaller radius than the radii of said paths adjacent to said sources;
   (d) means for application of voltages between said electrodes for establishing D.C. radially directed electric fields through which said beams travel to oppose the centrifugal forces on said beams and compress said beams as they approach said common space to maintain high particle density in said common space in said annulus to promote collisions between oppositely traveling particles in said beams; and
   (e) means responsive to the effects of collisions between particles in said beams.

* * * * *

UNITED STATES PATENT AND TRADEMARK OFFICE
CERTIFICATE OF CORRECTION

PATENT NO. : 4,397,809
DATED : August 9, 1983
INVENTOR(S) : Winfield W. Salisbury It is certified that error appears in the above—identified patent and that said Letters Patent is hereby corrected as shown below:

Column 1, line 37, change "laster-induced" to --laser-induced--.

Column 2, line 12, change "steadyradial" to --steady radial--.

Column 3, line 11, change "appopriate" to --appropriate--.

Column 3, line 40, change "FIG. 6;" to --FIG. 5;--.

Column 6, line 27, change "cylinder" to --housing--.

Column 6, line 60, after "114" insert --and--.

Column 7, line 12, after "113" insert --and--.

Column 7, line 19, delete "catches" and insert --catcher-- therefor.

Column 8, line 60, change "flowin" to --flow in--.

Column 10, line 28, delete "attenant" and insert --attendant-- therefor.

Column 10, line 56, delete "$dt^3$" and insert --$dt^2$-- therefor.

Column 12, line 10, delete "$U_{238}$" and insert --$U^{238}$-- therefor.

UNITED STATES PATENT AND TRADEMARK OFFICE
CERTIFICATE OF CORRECTION

PATENT NO. : 4,397,809          Page 2 of 2
DATED      : August 9, 1983
INVENTOR(S): Winfield W. Salisbury It is certified that error appears in the above—identified patent and that said Letters Patent is hereby corrected as shown below:

Column 12, line 25, delete "(H/Ze)" and insert --(M/Ze)-- therefor.

Column 12, line 32, delete "$10^{31}\ 10$" and insert --$10^{-10}$-- therefor.

*Signed and Sealed this*

Seventeenth Day of April 1984

[SEAL]

Attest:

GERALD J. MOSSINGHOFF

*Attesting Officer*   *Commissioner of Patents and Trademarks*